(12) United States Patent
Fratti et al.

(10) Patent No.: US 10,787,747 B2
(45) Date of Patent: Sep. 29, 2020

(54) ELECTROLYTIC CELL FOR GENERATING HYDROGEN

(71) Applicants: H2 ENGINEERING D.O.O., Izola (SI); Giovanni Fratti, Muggia (IT); Roberto Cremonese, Conegliano (IT); Massimiliano Boccia, Massa (IT)

(72) Inventors: Giovanni Fratti, Muggia (IT); Roberto Cremonese, Conegliano (IT); Massimiliano Boccia, Massa (IT)

(73) Assignee: H2 ENGINEERING D.O.O., Izola (SI)

( * ) Notice: Subject to any disclaimer, the term of this patent is extended or adjusted under 35 U.S.C. 154(b) by 0 days.

(21) Appl. No.: 16/073,273

(22) PCT Filed: Jan. 23, 2017

(86) PCT No.: PCT/IB2017/050333
§ 371 (c)(1),
(2) Date: Jul. 26, 2018

(87) PCT Pub. No.: WO2017/130092
PCT Pub. Date: Aug. 3, 2017

(65) Prior Publication Data
US 2019/0048480 A1  Feb. 14, 2019

(30) Foreign Application Priority Data
Jan. 26, 2016 (IT) .................. 102016000007663

(51) Int. Cl.
*C25B 1/12* (2006.01)
*C25B 9/10* (2006.01)
(Continued)

(52) U.S. Cl.
CPC .............. *C25B 1/12* (2013.01); *C25B 9/00* (2013.01); *C25B 9/10* (2013.01); *C25B 9/18* (2013.01); *Y02E 60/366* (2013.01)

(58) Field of Classification Search
CPC .... C25B 1/12; C25B 9/00; C25B 9/10; C25B 9/18; Y02E 60/366
See application file for complete search history.

(56) References Cited

U.S. PATENT DOCUMENTS 6,080,503 A * 6/2000 Schmid .................... C25B 9/10
429/483
2004/0238353 A1 12/2004 Kato et al.
(Continued)

FOREIGN PATENT DOCUMENTS

EP  1 985 727 A1  10/2008

OTHER PUBLICATIONS

Apr. 11, 2017 International Search Report issued in International Patent Application No. PCT/IB2017/050333.
(Continued)

*Primary Examiner* — Ciel P Contreras
(74) *Attorney, Agent, or Firm* — Oliff PLC (57) ABSTRACT

An electrolytic cell for generating hydrogen through the electrolysis of water, including an anodic compartment and a cathodic compartment separated by a solid polymeric electrolyte alkaline membrane. The anodic compartment includes a positive electrode or anode at least partially submerged in a layer of water, and the cathodic compartment includes a negative electrode or cathode. The cell is arranged between a first closing plate and a second closing plate. A tie-rod, provided in the central portion of the first closing plate, passes through the first closing plate, the cell and the second closing plate. A central collector for conveying the hydrogen generated in the cathodic compartment is arranged coaxially to the tie-rod and is in communication with the cathodic compartment through an opening formed in the tie-rod.

10 Claims, 4 Drawing Sheets

(51) Int. Cl.
*C25B 9/18* (2006.01)
*C25B 9/00* (2006.01)

(56) References Cited

U.S. PATENT DOCUMENTS

| | | |
|---|---|---|
| 2010/0288647 A1 | 11/2010 | Highgate |
| 2011/0048962 A1* | 3/2011 | Reece ...................... C25B 1/04 |
| | | 205/633 |
| 2015/0240368 A1 | 8/2015 | Iacopetti et al. |
| 2015/0308005 A1* | 10/2015 | Taniguchi ........... C25B 11/0447 |
| | | 205/635 |

OTHER PUBLICATIONS

Apr. 11, 2017 Written Opinion of the International Searching Authority issued in International Patent Application No. PCT/IB2017/050333.

\* cited by examiner

ELECTROLYTIC CELL FOR GENERATING HYDROGEN

TECHNICAL FIELD OF INVENTION

The present invention relates to an electrolytic cell for generating hydrogen through the electrolysis of water.

PRIOR ART

Various methods are known for generating hydrogen through the electrolysis of water. They can be differentiated between:

- HHO: this technology uses as the electrolyte, that is, the means that guarantees the passage of current within the solution, potassium hydroxide KOH or sodium hydroxide NaOH in an aqueous solution, typically between 25% and 35% in weight. This solution is placed between two stainless-steel electrodes and the water is split into hydrogen and oxygen in the same container by applying a voltage to the two electrodes. This yields a mixture of moist gases (also containing the electrolyte) in a hydrogen/oxygen ratio of 2:1.
- Alkaline water electrolysis: this most widely used technology is conceptually similar to the HHO method, the difference being that the compartments in which gaseous hydrogen and gaseous oxygen are formed are separated by a diaphragm of plastic material that prevents their mixing together. At the exit from the compartments are placed suitable purifiers for separating liquid from gas, with the recovery of the electrolyte, and for removing the small part of oxygen which, passing through the diaphragm, mixes with the hydrogen.
- PEM: is the acronym for "Polymer Electrolyte Membrane". In this technology, the compartments are separated by a polymeric membrane that acts both as a solid-state electrolyte (acid electrolytic membrane), and as a separator of the compartments.
- SOE: is the acronym for "Solid Oxide Electrolyte". This technology requires the use of high temperatures (HT) through steam, and for this reason it is also defined as "HT-Steam Electrolysis". In this technology, the electrolyte is represented by a ceramic diaphragm.
- HT-Alkaline: this is a new, recently developed technology, based on the conventional alkaline technology which improves the performance of the same through the use of high temperatures (normally up to 400° C.).
- AEM: is an acronym for "Alkaline Electrolyte Membrane", that is, alkaline with a polymeric membrane electrolyte. This is a recently developed technology, and for this reason it is still not widely applied, although it combines the advantages of the PEM technology with those of the conventional alkaline technology.

The large-scale production of hydrogen through electrolysis is currently dominated by the conventional alkaline technology, while for small applications the PEM technology is highly widespread. The HHO technology is adapted to generate a gas mixture of very low purity that limits its use to few particular applications. HT-Steam Electrolysis (or SOE) is used only for special applications, while HT-Alkaline technology is still at the experimental stage. The AEM technology is being recently under development, however its industrial application is encountering some problems due to the development of suitable high-performance and long-lasting anionic exchange membranes (alkaline).

The main advantages of the conventional alkaline and PEM technologies are derived from the low operating temperature (around 80° C. and 50° C. respectively), which makes it possible to have an electrolysis process with a moderate heat requirement compared to high-temperature technologies such as HT-Steam and HT-Alkaline. Moreover, the electrolytic cells used in the conventional alkaline and PEM technologies have relatively fast start-up and shut-down phases which, thanks to their low operating temperatures, are less crucial than those of the cells working at high temperatures. The polymeric membrane cells used in the PEM technology are less fragile compared to the solid-oxide cells used in the SOE technology, and for this reason they can be used for generating hydrogen and oxygen in mobile applications and at higher pressures.

For practical purposes, the conventional alkaline and the PEM technologies are those mainly adopted by the industry, although the AEM technology is enjoying a growing interest in the market.

Compared to the alkaline electrolytic cells, PEM cells offer a better hydrogen generating performance in small and efficient units that find application in niches of the market, although many companies are attempting to adapt this technology to the production of large cells, or electrolyzers. Moreover, PEM cells do not use a liquid electrolyte and have the advantage of offering high current densities and high cell efficiencies.

A problem common to both the above-mentioned technologies concerns the purity of the hydrogen generated, which is saturated with water vapour. This requires a drying process before using or storing the hydrogen.

A further drawback is related to the possible contamination that can occur in different manners, depending on the technology: in fact, the alkaline electrolyte adsorbs carbon dioxide very easily to form carbonates, while the acid polymeric membrane (PEM) requires the use of extremely pure water to avoid the buildup of cations that compete with protons in the charge transfer and determine an increased electric resistance of the cell.

The development of alkaline exchange membranes (AEM) and their application in alkaline membrane fuel cells (AMFCs) have been driven by the need to decrease the cost of materials, so as to make the fuel cells competitive with the technologies of existing batteries. In fact, the strongly acidic nature of the ionomer and of the NAFION® membrane, a material developed by DuPont® and forming the basis of the PEM technology, requires the use of catalysts based on costly noble metals, mainly platinum, while the AEM technology allows the use of catalysts based on economic metals and of electrodes with faster kinetics.

Despite the advantages mentioned above, the total efficiency of the low-temperature technologies—conventional alkaline and PEM—is not greater than 60%, and may achieve peaks of 72% with heat recovery. One of the systems for increasing energy efficiency is represented by the increase in temperature, as is the case with the HT-Alkaline technology (up to 400° C.) or with the HT-Steam technology (between 600° C. and 1000° C.). Unfortunately, the apparatuses performing such technologies are however more complicated and have considerable dimensions since, at those temperatures, water is in the gaseous state and takes up large volumes. Moreover, the operating control systems are much more complex.

One reason of the low efficiencies is due to the fact that, in current industrial applications, power is not supplied directly to the electrodes and the current is fed to the electrodes through the interposition of coupling materials known as current collectors which considerably lower the efficiency of the electrodes. Normally, these components are formed by a nickel-based foam or mesh.

Another reason of the above drawback is due to the fact that the technical solutions available on the market provide for a watertight insulation between the polymeric membrane and the anodic compartment (positive electrode) that prevents water from filtering past the membrane and from reaching the cathode; this insulation is generally achieved by means of O-ring seals that act directly on the non-metallic surfaces. This is also due to the need of electrically insulating the anode from the cathode by means of plastic materials whose surfaces are not suitable for the requirement of watertightness. As a result, it is not possible to achieve high pressure values generated by the hydrogen, which generally range around values not greater than 35 bar.

SUMMARY OF THE INVENTION

A main objective of the present invention is therefore to resolve the drawbacks of the prior art by devising an electrolytic cell for generating hydrogen that makes it possible to simplify the construction of an electrolysis apparatus while considerably lowering the production costs.

In the scope of the above objective, one purpose of the present invention is to reduce the size of the cell without varying the quantity of hydrogen generated, or to increase the hydrogen output without altering the size of the cell with respect to the dimensions generally used in the field of reference.

Another purpose of the present invention is to provide a cell with improved tightness capable of withstanding high pressure values.

A further purpose is to increase the efficiency of the cell.

Yet another purpose is to lower the costs of the hydrogen generating process.

A last, but not least, purpose is to devise an electrolytic cell for generating hydrogen that achieves the above task and purposes at competitive costs and that can be obtained with the usual well-known plants, machinery and equipment.

The above task and purposes, and others that will become more apparent in the following description, will be achieved by an electrolytic cell for generating hydrogen as defined in claim 1.

BRIEF DESCRIPTION OF THE DRAWINGS

Further characteristics and the advantages of the present invention will become more apparent from the following description of a preferred but not exclusive embodiment illustrated purely by way of non-limiting example with reference to the accompanying drawings, wherein.

DETAILED DESCRIPTION OF THE INVENTION

Figure 1:
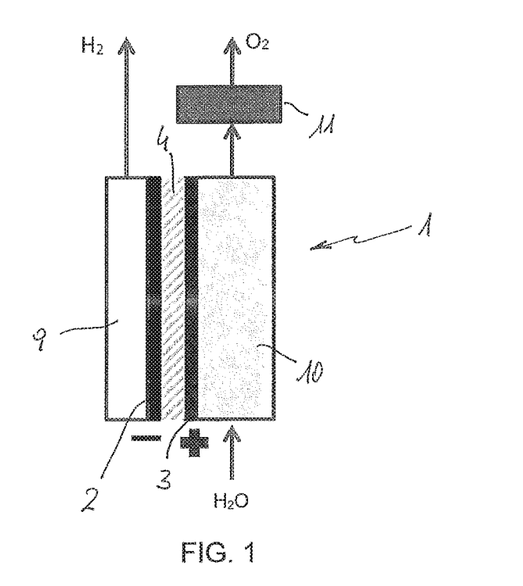
FIG. 1 schematically illustrates the operation of an electrolytic cell.
Figure 2:
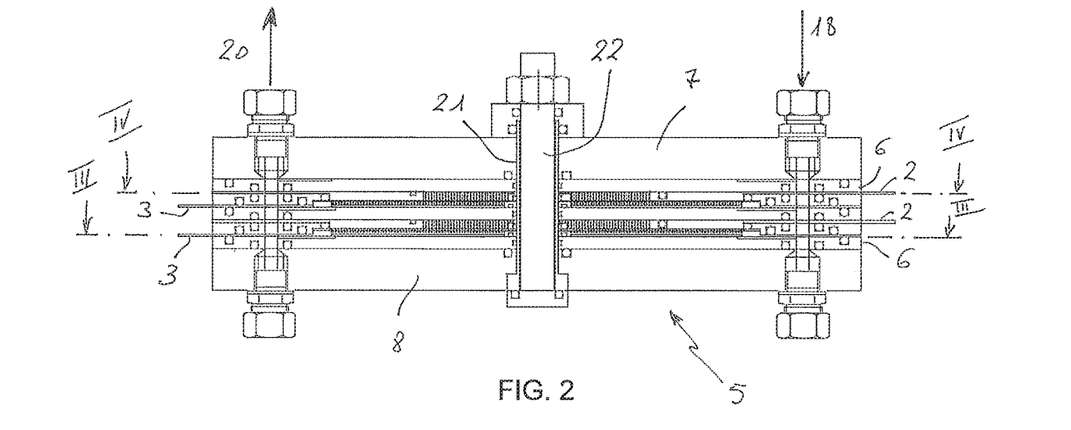
FIG. 2 is a cross section of an assembly of cells for generating hydrogen, also defined as electrolytic stack, comprising two cells according to the present invention seen along the diametrical plane corresponding to the electrode connecting pins.
Figure 3:
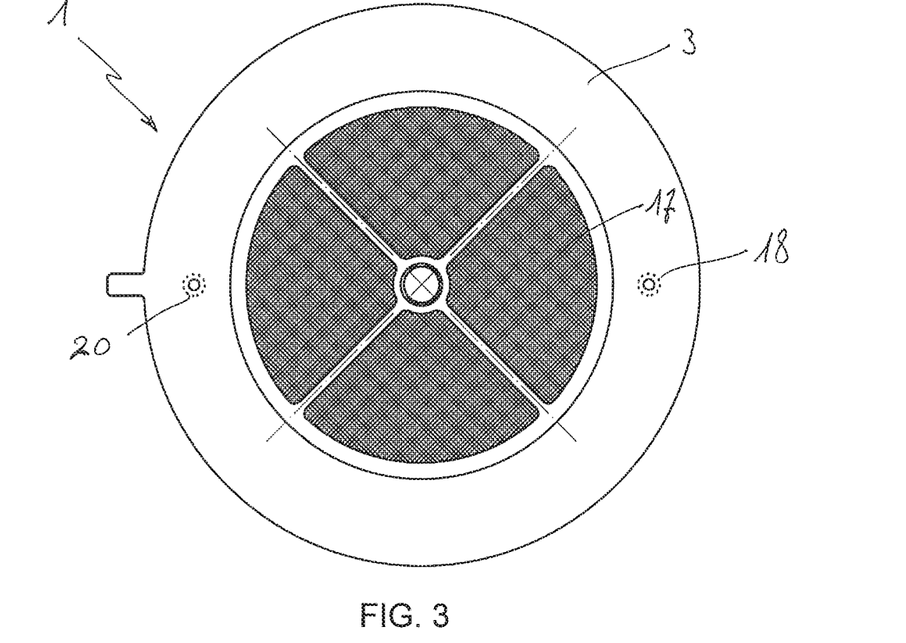
FIG. 3 is a cross section along plane III-III, corresponding to an anodic plane, of the cell assembly of FIG. 2.
Figure 4:
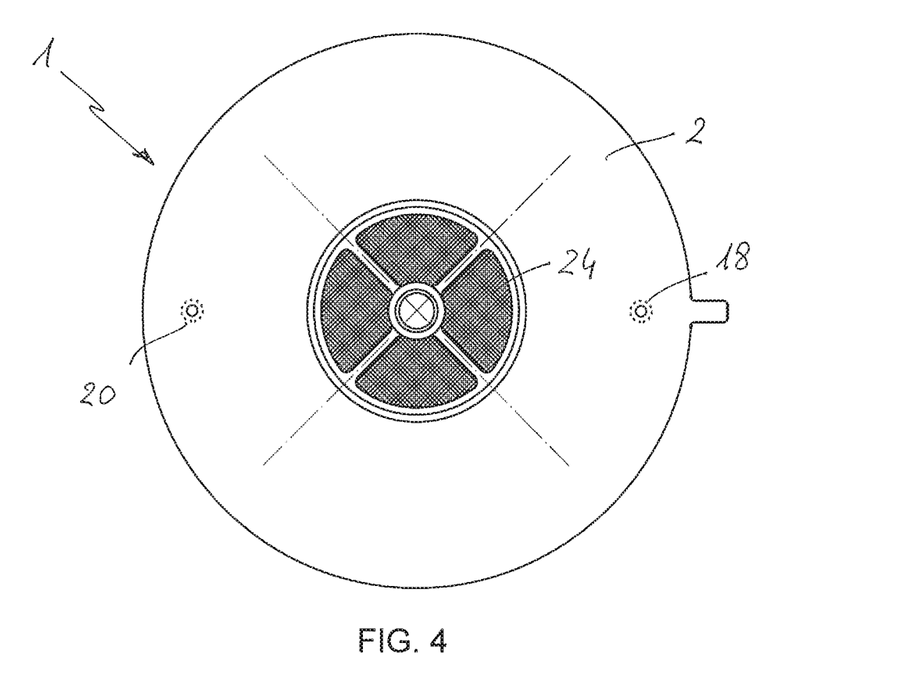
FIG. 4 is a cross section along plane IV-IV, corresponding to a cathodic plane, of the cell assembly of FIG. 2.
Figure 5:
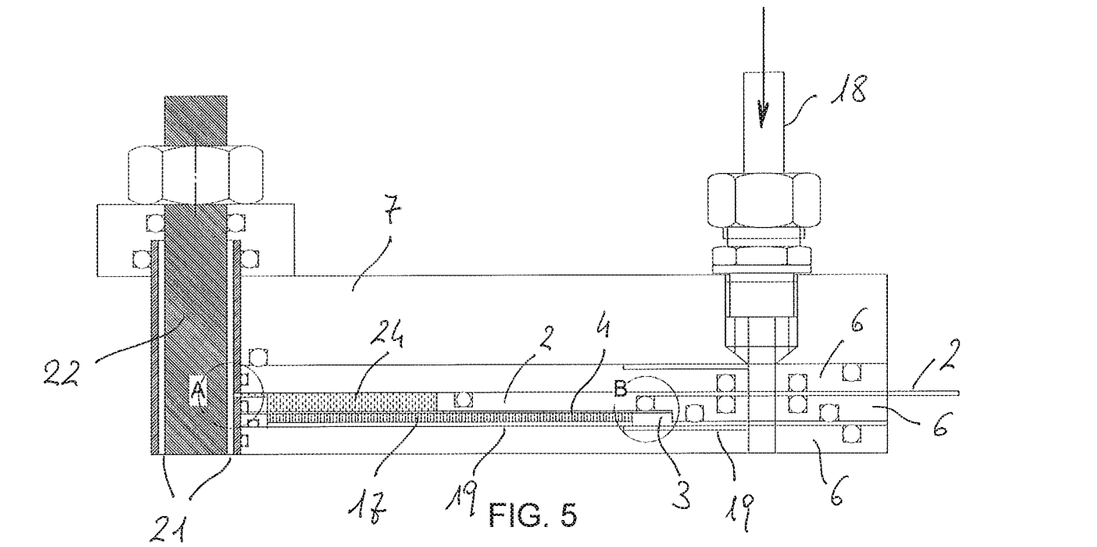
FIG. 5 is a detail of FIG. 2 corresponding to the right portion, referring to FIG. 2, of the upper cell.

Before turning to the detailed description of the present invention, hereinbelow are given, for a clearer understanding of the disclosure, the definitions of the terms used in the present description with reference to the above figures:

Electrolytic cell (or simply "cell"): is the container wherein the electrolytic reaction takes place. With reference to FIG. 1, the cell 1 is essentially made up of a negative electrode 2, a positive electrode 3, a membrane or a diaphragm 4, depending on the technology;

Water electrolysis: literally means "splitting the water" and indicates the reaction through which water is split into its basic components, that is hydrogen and oxygen through the effect of the passage of electric current through it;

Electrolytic stack: with reference to FIG. 2, the electrolytic stack 5 is a unit made up of a number of cells so as to obtain a larger hydrogen flow. The cells are separated by bipolar containment plates made of steel 6. The cell hardware (that is, the set of all the components inside the cell) is supported by a frame, while the current applied for the electrolytic reaction is fed through current collectors. All these elements together with the electrodes 2, 3 and the membrane or diaphragm 4, if any, are contained in the frame. A number of frames (thus a number of cells) are stacked together, depending on the flow of hydrogen required, so as to form a stack 5. The stack 5 is closed at both sides by a first upper closing plate 7 and by a second lower closing plate 8 made of steel or composite material of appropriate thickness (end plates);

Negative electrode: the negative electrode 2 is the negative pole of the current that is applied to the cell. Hydrogen evolves on its contact surface. Technically, it is also called "cathode".

Positive electrode: the positive electrode 3 is the positive pole of the current that is applied to the cell. Oxygen evolves on its contact surface. Technically, it is also called "anode".

Cathodic compartment: the cathodic compartment 9 is the portion of the cell (semi-cell) in which hydrogen evolves;

Anodic compartment: the anodic compartment 10 is the portion of the cell (semi-cell) in which oxygen evolves;

Ionic charge transfer (or more simply "charge transfer"): the electric charge can be carried in a conductive material through electrons or in a liquid solution through ions (electrically charged molecules). In order to have current passing through the solution, it is necessary to "close the circuit", that is, to make it so that there is a cycle in which the current applied from outside is carried from one electrode to the other. This mechanism is called ionic charge transfer and it is achieved by the electrolyte, which in the present case consists of the membrane 4;

Solid polymeric membrane (or more simply "membrane"): the membrane 4 is the component that is interposed between the two compartments, anodic 10 and cathodic 9, to keep the gases (hydrogen and oxygen) separated during their generation and that performs the function of electrolyte allowing the charge transfer to take place through the passage of the ions;

PEM is the acronym for "Polymer Electrolyte Membrane" (in the literature it is also defined as "Proton Exchange Membrane"). Aside from the meaning applied to it, this term is used to indicate the technology that uses, as a separator of the anodic compartment 10 from the cathodic compartment 9, a solid polymeric membrane 4 which, as already mentioned above, also functions as electrolyte allowing the passage of ions H+;

Ion OH−: it is one of the two ions, together with ion H+, into which water dissociates. It is also known as alkaline ion. It has a high concentration in caustic (basic) substances.

Ion H+: it is the other of the two ions, together with ion OH−, in which water is dissociated. It has a high concentration in acid substances.

The present invention uses basically the AEM technology, that is, alkaline with solid polymeric electrolyte (membrane), which makes it possible to lower the costs of production thanks to the use of catalysts with a non-noble metal base in both the anode 3 and the cathode 2 and an alkaline membrane 4 normally available in the market or, advantageously, an alkaline membrane 4 with the characteristics that will be described later. The system conceived in this manner offers the advantages of both the conventional alkaline technology, thanks to the use of low-cost materials, and of the PEM technology, which makes it possible to have compact electrolytic cells, high current density and a gas pressurization differential of up to 30 bar or even higher values, with the further saving due to the simplicity of the plant due to the reduction of the hydrogen purification process.

The AEM technology is the most innovative water electrolysis technology and, as already mentioned in the preamble of the description, is still scarcely widespread. The basic principle and the process schematic, shown in FIG. 1, are similar to those of the PEM technology, but in this case the charge transfer is guaranteed by OH− ions as in the conventional alkaline technology instead of H+ ions, as is the case in the PEM technology. Thus, in the AEM there is a joining of the advantages of conventional alkaline, mainly the economy of the components, with those of the PEM technology, mainly the possibility of obtaining hydrogen at high pressure. The hydrogen obtained through this technology has a high degree of purity and high pressure without requiring the provision of post-purification and post-compression systems on exit from the cell.

Essentially, the characteristics and advantages offered by the AEM technology with respect to conventional alkaline and to PEM are the following, as summarized in the table below:

high purity of the hydrogen generated;
high flow of hydrogen output, and thus high production capacity;
high pressure of hydrogen output;
low water content in the hydrogen generated, and thus the process does not require drying the hydrogen;
low cost of materials;
low purity of the water used as fuel (it is possible to use the demineralized water that is normally used for batteries or irons);
low maintenance.

| | TECHNOLOGY | | |
|---|---|---|---|
| ADVANTAGE | Liquid electrolyte alkaline | PEM (acid) | AEM membrane alkaline |
| 1) High hydrogen pressure | | x | x |
| 2) High purity of hydrogen | | x | x |
| 3) High flow of hydrogen | x | | x |
| 4) Low quality of water used as fuel | x | | x |
| 5) Possibility of using demineralized water as is used in irons or batteries | | | x |
| 6) Absence of caustic substances for the electrolyte | | x | x |
| 7) Low cost of components | x | | x |
| 8) Low water content in the hydrogen generated | | | x |
| 9) Low maintenance | | x | x |

With reference to FIG. 1, the process schematic of the AEM technology is the following: the feeding water ($H_2O$) is pumped inside the anodic compartment 10 where, permeating through the solid polymeric membrane 4, it comes into contact with the negative electrode 2, which, owing to the electric current supplied, promotes the evolution of the gaseous hydrogen $H_2$ in the cathodic compartment 9. Together with the gaseous hydrogen are formed $OH^-$ ions, which, migrating toward the positive electrode 3, oppose the migration of the water from the anodic compartment 10 to the cathodic compartment 9. When the $OH^-$ ions come into contact with the positive electrode 3 there is the evolution of oxygen $O_2$, which, after having passed through the moisture separator 11 to recuperate the water present in the gas, is released into the atmosphere. The gaseous hydrogen $H_2$ formed in the cathodic compartment 9 is instead recovered with a very low quantity of water which allows it to be used, for 90% of the applications, directly without subsequent purification steps. The presence of the solid polymeric membrane 4 makes it possible to compress the hydrogen inside the cathodic compartment 9 up to high pressure values. This process is repeated in all the cells 1 which make up the electrolytic stack 5.

According to an innovative aspect of the present invention, the efficiency of the cell 1 can be markedly increased by improving the watertightness of the insulation between the polymeric membrane 4 and the anodic compartment 10 (positive electrode 3) for the purpose of preventing water from filtering past the membrane 4 and reaching the cathode 2. In this manner, it is possible to increase the pressures generated by the hydrogen, without using dedicated compressors.

To achieve this, the electrolytic cell 1 for generating hydrogen according to the present invention has a cathodic compartment 9, where the hydrogen leaving the polymeric membrane 4 is generated, made of the same material as the anodic compartment 10.

Figure 6:
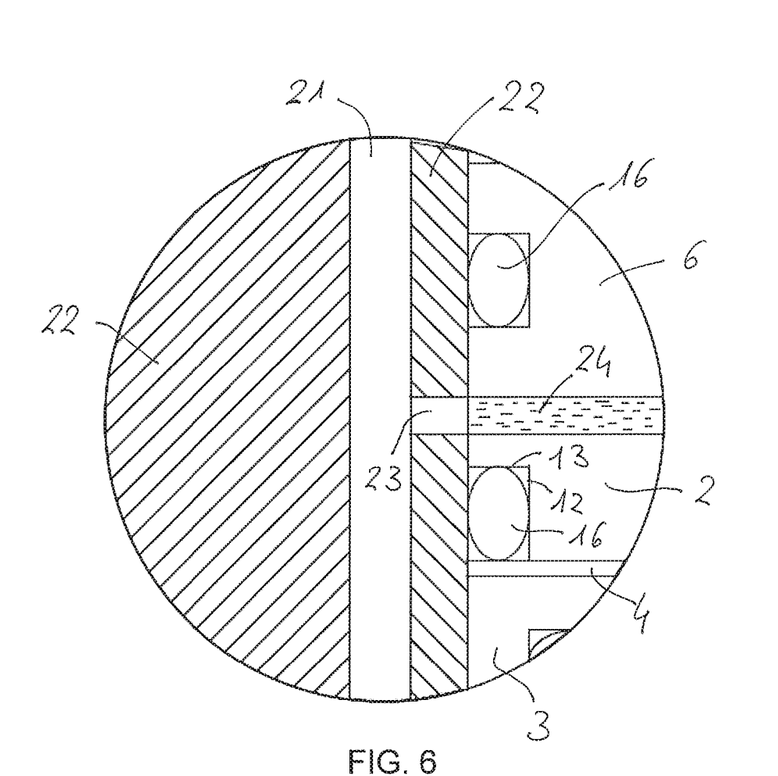
FIG. 6 is an enlarged detail corresponding to the portion shown with A of the cell of FIG. 5.
Figure 7:
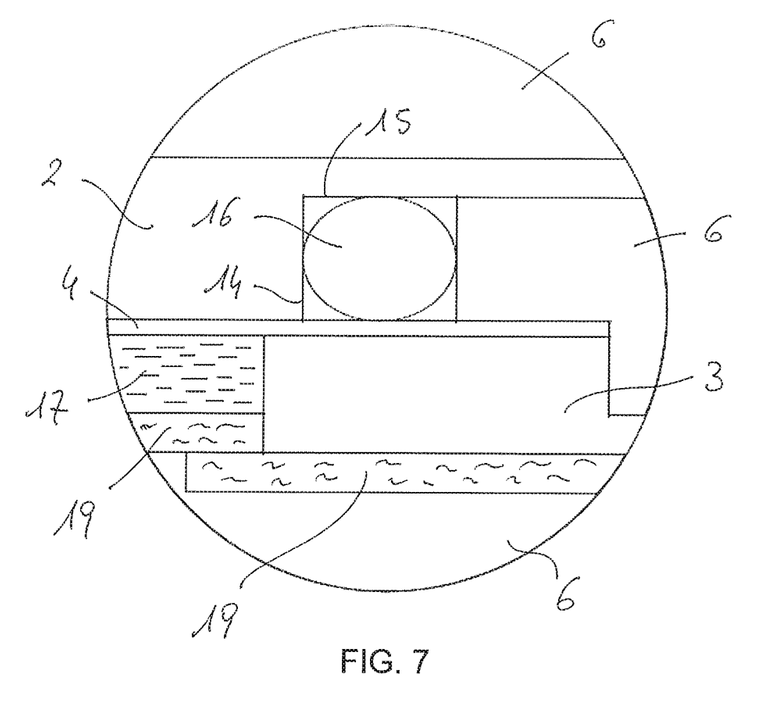
FIG. 7 is another enlarged detail corresponding to the portion shown with B of the cell of FIG. 5.

In addition, both the anodic 3 and the cathodic 2 electrodes are made as a single body instead of being made up, as in prior-art technologies, of layers of materials stacked on each other in a sandwich-like structure. This makes it possible to submit the surfaces of the end portions of the electrodes, indicated in FIGS. 6 and 7 with reference numerals 12, 13, 14, 15 and located, respectively, in the central zone and in the peripheral zone of the cell 1, to mechanical precision machining operations, for example grinding or sandblasting, so as to make them particularly adapted to house one or more O-ring-type seals 16 suitable for the pressures that are generated during the evolution of the gases, in particular during the generation of hydrogen.

It is well known that the efficiency of the cell is inversely proportional to the resistance of the electrodes, and therefore electrodes made in a single piece, in which there is no increased resistance in the passage from one layer to the next as in the case of electrodes with a sandwich-like structure, are more conductive and allow an increased efficiency of the cell, which, in the case of the present invention, can exceed 80%.

Both the anode 2 and the cathode 3 consist of a support of a conductive alloy, resistant to the alkaline environment, having a compact and homogeneous structure on which are applied, by deposition treatments (for example sputtering or screen printing with subsequent sintering), the catalysts for the hydrogen evolution reaction (HER) and for the oxygen evolution reaction (OER). In this manner, the catalysts also form a single body with the electrodes 2 and 3.

The material of the anode 2 can be a metal alloy or a sintered metallic oxide, while the cathode 3 must be made of a material resistant to corrosion due to the contact with the alkaline membrane 4 (AEM), which, in order to perform its function of charge transfer of the OH− ions carried by the water, must necessarily be wet.

For what concerns the catalyst, also defined as "electro-catalyst", there has recently been a widespread increase in the use of transition metal oxides (TMOs) due to their low cost compared to noble metals (Platinum Group Metals, PGM), like iridium and ruthenium used in the form of oxide for the OER, or platinum and palladium for the HER.

In the cell according to the present invention it is possible to use for the OER mixtures of metal-based TMOs, like for example copper, cobalt, strontium, lanthanum, iron, nickel or other oxides of the perovskite type or spinels, while for the HER it is possible to use TMOs but with different metals, like for example lanthanum, iron, nickel, cobalt, manganese, molybdenum deposited on ceria, alumina, zirconia supported on carbon.

Alternative or complementary electrocatalysts are represented by the use of nanoparticles of molybdenum sulphide or metallo-phthalocyanine derivatives. The possibility of reducing the dimensions of nanoparticles of TMOs through lithium-induced conversion reactions, which increase the surface and the activity of the catalyst, allows them to be used both for OER and for HER, simplifying the production process of the catalyst (which is equal for both compartments) and the consequent process of assembling the system.

All this allows a greater flexibility in the production of the cell, considerably lowering costs and increasing the efficiency of the cell.

The improved hydraulic tightness, achieved by making the membrane 4 work on both surfaces of the electrodes, avoids possible pollution of the hydrogen caused by any microleaks of water from the anodic compartment 10, also at differential pressures (between the anodic compartment 10 and the cathodic compartment 9) in the order of many tens of bars. In fact, the cell according to the present invention makes it possible to have electrodes that display, only in the seal areas, a roughness lower than 3 μm, while the portion 17 of the positive electrode 3 submerged in the water (anodic compartment) can advantageously be made with a different material, of porous type permeable to water and conductive, applied to the electrode with the same deposition treatments as the catalysts described above, such as for example sputtering or screen printing with subsequent sintering. These treatments make it possible to intimately bind the porous material to the support material forming the electrode 3 so as to still form a single-body electrode, with evident reduction of the resistance and with the possibility of modulating other chemo-physical properties of the electrode, such as permeability to water. Still advantageously, the portion 17 of the positive electrode 3 submerged in the water can be charged with appropriate catalysts of the same type as those described above, which promote ionic exchange and, at the same time, increase the electrical conductivity of the anodic compartment 10 and enhance the efficiency of the cell. Through these treatments is thus obtained an electrode whose support material is "doped" with catalysts and/or different materials that can also vary its chemo-physical properties but which however form a single body with the support material.

Advantageously, and in a similar manner as described above, the cathode 2 can have a porous portion 24 having a smaller radial extension than the porous portion 17 of the anode.

The polymeric membrane 4 is an anionic (or alkaline) exchange polymeric membrane whose functionality is based on the presence of cationic groups that ensure the transport of the ions OH− and therefore the conductivity. The cationic group is represented by vinyl-benzyl-chloride (abbreviated as VBC):

The substrate is represented by a polymeric chain like, for example, polyethylene (PE) or polypropylene (PP) functionalized with the VBC in side chain.

While conductivity in this type of membrane, in the present state of the art, is mainly connected to the presence of VBC groups in side chain, the other characteristics of the membrane depend mainly on the main chain of the polymer, which represents its substrate.

An innovative membrane particularly suitable to be used in the present invention can be based on main polymeric chains, such as de example PE, PP, Polysulphone (PSU), Polyethersulphone (PES), co- or ter-polymers based on Polystyrene (PS). The hygrophilous/hydrophobous ratio can be varied depending on the type of side chain grafted and on its length. The thermal and mechanical resistance can be adjusted on the basis of the percentage of cross-linked groups, usually using a bifunctional amine like 1,4-diazobicycle [2.2.2] octane (DABCO).

The substrate can be made of graphene oxide (GO), a very versatile, strong and easy to find material. It is possible to functionalize it with VBC or another amide group directly during the synthesis. In a post-synthesis process, it is possible to introduce the catalysts for the HER and for the OER that could be coincident, that is, made of the same material, with a reduction of the costs of the production process, through the synthesis of a single catalyser for both electrodes.

The functionalization of the substrate can be achieved in various manners, for example through radical coupling reactions induced by radiation, and the characteristics of the membrane can be improved by introducing specific nanoparticles in its structure. A different embodiment can contemplate the adoption of ceramic materials dispersed in the membrane, with a consequent greater mechanical resistance.

An electrolytic stack 5 that comprises a plurality of cells made according to the present invention is represented schematically in the figures from 2 to 4, while in the figures from 5 to 7 are shown some details of the assembly.

A first water inlet conduit 18 is provided on a first peripheral portion of the first upper closing plate 7 passing through the restraint plates 6 and the electrodes 2, 3. At the lower surface of each positive electrode 3 the water is drawn from the inlet conduit 18 through a suitable canalization so that a layer of water 19 can spread substantially on all the lower surface of the anode 3, which is thus maintained "wetted" so as to bring about the electrolysis process.

On a second peripheral portion of the upper first closing plate 7 is provided a second conduit 20 for the outflow of the water mixed with oxygen, formed during the electrolysis process, in the same manner of canalization as the inlet. Seals, advantageously of the O-ring type, are suitable provided in the restraint plates 6 and in the electrodes 2, 3 to guarantee the watertightness.

According to an innovative characteristic of the present invention, the hydrogen generated is conveyed through a central collector 21 which, at the same time, makes it possible to insert a tie-rod 22 arranged coaxially to the central collector 21 and suitable to considerably reduce the deformations of flexural type that take place in the central area of the cells due to the internal evolution of hydrogen gas at high pressure.

An opening 23 formed in the tie-rod 22 communicates the cathodic compartment 9, where the hydrogen is generated, with the central collector 21 to allow the passage of the hydrogen produced by the cathodic compartment 9 to the central collector 21, which conveys the hydrogen outward toward, for example, a collecting container for storing the compressed hydrogen.

It is pointed out that this particular configuration makes it possible to distribute the water over the whole surface of the anode 3 so as to have a larger exchange surface and thus achieve an increased production of hydrogen or, alternatively, reduce the dimensions of the cell so as to have more compact stacks. Otherwise, even in recent prior-art applications, the distribution of the water is carried out in a substantially annular or radial manner, thus utilizing only one portion of the surface of the electrode.

As shown in FIG. 2, the central tie-rod 22 is fastened to the two closing plates 7, 8 of the electrolytic stack 5 so as to maintain the individual cells perfectly pressed against each other and avoid possible flexures in the central area of the cells. This structural arrangement makes it possible to increase the operating pressures of the electrolytic stack compared to similar systems found on the market, without requiring an excessive increase of the weight and dimensions of the plant, in addition to preventing any lateral leaks due to a deformation of the cells.

Naturally, the above configuration is also equally applicable to a stack comprising a single cell enclosed between two closing plates 7, 8 instead of a group of stacked cells, while achieving the same advantages indicated above.

The insertion of the tie-rod 22 provided with a coaxial central collector 21 for collecting and conveying the hydrogen generated is allowed by the fact that the electrodes are made in a single piece to form a single body with the respective catalysts, as described above. The collector 21 is in communication with the central part of the cathode 3 through the opening 23 and is isolated by simple seals 16 of the O-ring type. In the state of the art it is not possible to insert such a tie-rod due to the fact that electrodes and catalysts are made in a sandwich-like arrangement and with different materials, so that it is not possible to obtain uniform surfaces and with low surface roughness by means of mechanical operations capable of cooperating with the seals 16 to guarantee perfect tightness. For this reason, too, the pressures that can be achieved with the current technologies are limited to a few tens of bars. In the present invention, as already explained above, the operating pressures can be considerably increased and thus larger quantities of gas can be accumulated in smaller volumes (up to 10 times smaller), so as to be able to achieve a considerable reduction in the dimensions of the cell with equal quantities of hydrogen being generated, and thus achieve a more compact and smaller size of the plant.

The arrangement of the cells in the stack 5 illustrated schematically in FIG. 2, in which two consecutive cells are shown by way of example, makes it possible to connect all the cathode electrodes 2 to the same potential, so as to achieve an effective connection in parallel, and therefore a more efficient power supply with a consequent increase in efficiency; the same can be said for the anode electrodes 3, thereby making it possible to have the same difference in electric potential for each electrode of the individual cells. This is also achieved through the insertion of restraint plates 6 of insulating material. This new arrangement of the cells, in which every electrode is fed separately, and the better support of the membrane on perfectly smooth areas, allows an equal distribution of tension on the individual surfaces of the membrane and on the surfaces of the electrodes while avoiding possible overpotential points with point source emissions of electrical discharges that are harmful for the correct operation of the cells; such electrical discharges can damage the integrity of the internal components in the cell, especially the membrane. In addition, the separate feeding of the electrodes makes it possible to increase, with voltage being equal, the supply current and to boost the efficiency of the cell while decreasing the dimensions with an equal production of hydrogen. The greater efficiency achieved makes it possible to reduce the size of the cells by about half with an equal generation of hydrogen.

This new configuration makes it possible, moreover, to have more precise internal components (with better mechanical tolerances), and the adoption of the central tie-rod allows the production of larger cells compared to the current ones without having to reduce the operating pressures.

In the prior art applications that use the same type of membrane, but with electrodes made up of a plurality of components arranged in a sandwich-like structure, it is not possible to obtain the same type of connection in parallel because the internal distribution of the electrical potentials of the individual cells depends on how current is transmitted through the individual elements that make up the electrodes, and therefore on the inevitable drops of potential from one component to the next. Such drops of potential cannot be exactly equal for each single electrode and each single cell. In the current state of the art, it is not therefore possible to have the same difference of potential on each individual cell.

From the above, it is thus evident how the present invention achieves the initially foreseen purposes and advantages: in fact, an electrolytic cell has been devised for the generation of hydrogen that makes it possible to simplify the construction of an electrolysis plant while considerably lowering the costs of production, in addition to having a sizable reduction in the dimensions of the cell, with an equal hydrogen output, and to achieve in this manner an extremely compact structure of the cell and consequently of the relative plant.

In addition, a cell having an improved sealing capacity has been realized with the capability of withstanding high pressures and making it possible to considerably increase the efficiency of the cell, in addition to enabling the production of larger cells compared to current cells without having to lower the operating pressures.

Naturally, the present invention is amenable of many applications, modifications or variants without thereby departing from the scope of patent protection, as defined by independent claim 1.

In addition, the materials and equipment used for implementing the present invention, as well as the shapes and dimensions of the individual components, can be the most appropriate to meet the specific requirements.

The invention claimed is:

1. An electrolytic cell for generating hydrogen through electrolysis of water, comprising:
   (i) an anodic compartment comprising a positive electrode or an anode configured to be at least partially submerged into a layer of water,
   (ii) a cathode compartment comprising a negative electrode or a cathode, and
   (iii) a solid polymer electrolyte alkaline membrane that separates the anodic compartment and the cathode compartment,
   wherein:
   surfaces of respective end portions of the cathode and the anode respectively arranged at a peripheral region and at a central region of the cell are precisely machine finished to adapt the surfaces to house one or more seals,
   the cell being disposed between a first closing plate and a second closing plate,
   a tie-rod is provided at a central portion of the first closing plate,
   the tie-rod passing through the first closing plate, the cell and the second closing plate, and
   a central collector for conveying the hydrogen generated in the cathode compartment being coaxially arranged in respect to the tie-rod, the central collector communicating with the cathode compartment through an opening obtained on the tie-rod.

2. The electrolytic cell as in claim 1, wherein:
   suitable catalysts adapted for activating the reaction of hydrogen (HER) and oxygen (OER), respectively, are respectively applied on the cathode and the anode by deposition processes, and
   the catalysts form the single layer with the cathode and the anode, respectively.

3. The electrolytic cell as in claim 1, wherein:
   a first water inlet conduit is provided on a first peripheral portion of the first closing plate, and
   a suitable canalization being provided at a lower surface of the anode and being configured to draw off a quantity of water from the first water inlet conduit so as to form the layer of water, in which at least a portion of the anode is configured to be submerged.

4. The electrolytic cell as in claim 3, wherein the whole lower surface of the anode is configured to be submerged into the layer of water.

5. The electrolytic cell as in claim 3, wherein:
   the portion of the anode configured to be submerged into the layer of water is made of porous conductive material permeable to water, and
   the porous conductive material is applied to the anode through deposition processes so as to form a single body with a material constituting the anode.

6. The electrolytic cell as in claim 1, wherein the tie-rod is fastened to the first closing plate and to the second closing plate.

7. The electrolytic cell as in claim 1, wherein the precisely machine finished surfaces have a roughness of lower than 3 μm.

8. The electrolytic cell as in claim 1, wherein:
   (i) the negative electrode or the cathode is made as a single layer; or
   (ii) the positive electrode or the anode is made as a single layer, wherein the single layer is not a sandwich-like structure.

9. Electrolytic stack comprising a plurality of cells as in claim 1, the cells being mutually overlapped and mutually separated by restraint plates, and the electrolytic stack being disposed between the first closing plate and the second closing plate.

10. The electrolytic stack as in claim 9, wherein the negative electrodes and the positive electrodes of the plurality of cells are connected to the same electric potential such that a connection in parallel is obtained between the negative electrodes and positive electrodes.

* * * * *